(12) United States Patent
Lee et al.

(10) Patent No.: US 6,741,759 B2
(45) Date of Patent: *May 25, 2004

(54) METHOD AND APPARATUS FOR INTERPOLATION

(75) Inventors: Michael M. Lee, San Jose, CA (US); Kun-Nan Cheng, Hsinchu (TW); Fu-Chi Wang, Hsinchu (TW)

(73) Assignee: Macronix International Co., Ltd., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 10/395,613

(22) Filed: Mar. 24, 2003

(65) Prior Publication Data

US 2003/0190093 A1 Oct. 9, 2003

Related U.S. Application Data

(63) Continuation of application No. 09/293,229, filed on Apr. 16, 1999, now Pat. No. 6,539,128.

(51) Int. Cl.[7] .............................. G06K 9/32; H04N 1/46
(52) U.S. Cl. ........................................ 382/300; 358/525
(58) Field of Search ................................. 382/300, 220, 382/221, 241, 254, 274, 266, 279, 305, 299; 358/525; 345/442, 475; 708/290, 300

(56) References Cited

U.S. PATENT DOCUMENTS

| | | | |
|---|---|---|---|
| 3,789,203 A | 1/1974 | Catherall et al. ............ 235/152 |
| 4,763,293 A | 8/1988 | Takei et al. ................... 364/723 |
| 5,020,014 A | 5/1991 | Miller et al. .................. 364/723 |
| 5,229,698 A | 7/1993 | Minnich et al. ....... 318/568.15 |
| 5,235,534 A | 8/1993 | Potter .................... 364/724.01 |
| 5,379,241 A | 1/1995 | Greggain ..................... 364/723 |
| 5,949,695 A | 9/1999 | Snell ............................ 364/723 |
| 5,991,464 A | 11/1999 | Hsu et al. ..................... 382/300 |
| 5,995,682 A | 11/1999 | Pawlicki et al. ............. 382/300 |
| 6,023,302 A | 2/2000 | MacInnis et al. ............ 348/597 |
| 6,278,466 B1 | 8/2001 | Chen ........................... 345/473 |

Primary Examiner—Kanji Patel
(74) Attorney, Agent, or Firm—Ernest J. Beffel, Jr.; Haynes Beffel & Wolfeld LLP

(57) ABSTRACT

The invention provides a method and device for interpolating between a first and second pixel in a video display system, where the first pixel has a first pixel value and a first coordinate on a first axis, and the second pixel has a second pixel value and a second coordinate on the first axis. The invention provides a first intermediate coordinate in between the first and second coordinates on the first axis, and determines a weight factor for the first intermediate coordinate. The weight factor is determined by either inputting the first intermediate coordinate into a first blending function if the first intermediate coordinate is within a first domain, or by inputting the first intermediate coordinate into a second blending function if the first intermediate coordinate is within a second domain. Once the weight factor is determined, a first interpolated value is calculated from a first product of the weight factor and a function of the first pixel value and the second pixel value.

13 Claims, 3 Drawing Sheets

METHOD AND APPARATUS FOR INTERPOLATION

RELATED APPLICATIONS

This application is a continuation of U.S. application Ser. No. 09/293,229, filed 16, Apr. 1999, U.S. Pat. No. 6,539,128.

BACKGROUND OF THE INVENTION

1. Field of the Invention

The present invention relates to interpolation, and more specifically, to a method and apparatus for interpolating between successive input signals.

2. Description of Related Art

Mathematic interpolation is used in numerous technological fields including, for example, digital processing and analog sampling applications. In the past, interpolation has been accomplished using approaches such as "nearest neighbor" methods and polynomial approximations using linear, quadratic and cubic polynomials.

Linear interpolation approximates values between two points using a straight line function, provided by $$y = mx + b \quad (1)$$

for a domain range such as $0 \leq x \leq 1$. With reference to the above equation, known points at x=0 and x=1 are used to determine the slope m and the intercept b. Since only two points are needed to interpolate using a linear function, computational costs associated with linear interpolation are minimal. However, the output resulting from linear interpolation is too inaccurate for many applications. For example, in image processing applications, linear interpolation produces output signals having less clarity and contrast in comparison to the input signals.

A general quadratic interpolation curve approximates values between two points using a second order function, provided by $$y = ax^2 + bx + c \quad (2)$$

for a domain of $0 \leq x \leq 1$. Quadratic interpolation in general requires three known points, e.g. f(−1), f(0), and f(1). One interpolation equation that may be obtained using a second order function is $$f = ((f(-1) - 2f(0) + f(1))/2)x^2 + (f(1) - f(-1))x + f(0) \quad (3)$$

for a domain of $0 \leq x \leq 1$. Another quadratic interpolation equation is disclosed in U.S. Pat. No. 5,379,241 to Greggain, which provides $$f = ((f(-0.5) - 2f(0) + f(0.5))/0.5)x^2 + (f(0.5) - f(-0.5))x + f(0) \quad (4)$$

for a domain of $-0.5 \leq x \leq 0.5$. Equation (4) may also be combined with equation (1) to yield $$f = (f(-1) - 2f(0) + f(1))x^2 + ((f(1) - f(-1))/2)x + f(0) \quad (5)$$

for a domain of $-0.5 \leq x \leq 0.5$.

Similarly, cubic or higher order interpolations are also known in the art, as shown by U.S. Pat. No. 4,578,612, which implements higher order polynomials as weight factors for cubic convolution interpolation.

For applications that require better clarity and contrast, second or higher-order interpolations are generally preferred. However, higher order interpolations come at a cost of increased complexity and resources for performing interpolation. Therefore, there is a need for an interpolation method and application that provides accuracy without computational demands associated with second and higher order interpolation methods.

These and other shortcomings of the known art will be addressed by this invention.

SUMMARY OF THE INVENTION

An embodiment of the present provides a method for interpolating between a first and second pixel in a video display system, where the first pixel has a first pixel value and a first coordinate on a first axis, and the second pixel has a second pixel value and a second coordinate on the first axis. The method includes the steps of providing a first intermediate coordinate in between the first and second coordinates on the first axis. The method further includes determining a weight factor for the first intermediate coordinate. The weight factor is determined by either inputting the first intermediate coordinate into a first blending function if the first intermediate coordinate is within a first domain, or by inputting the first intermediate coordinate into a second blending function if the first intermediate coordinate is within a second domain. The method further includes calculating a first interpolated value from a first product of the weight factor and a difference between the first pixel value and the second pixel value.

In another embodiment of the present invention, a method is provided for interpolating between a first and second pixel, where the first pixel has a first pixel value and a first coordinate on a first axis, and the second pixel has a second pixel value and a second coordinate on the first axis. The method includes the steps of providing a first intermediate coordinate in between the first and second coordinates on the first axis, and determining a weight factor for the first intermediate coordinate. The weight factor may be determined by either inputting the first intermediate coordinate into a first quadratic blending function if the first intermediate coordinate is within a first domain, or by inputting the first intermediate coordinate into a second quadratic blending function if the first intermediate coordinate is within a second domain. The method also includes the step of calculating a first interpolated value from a linear equation comprising a constant equal to either the first or second pixel value, and a product of the weighting factor and a difference between the first pixel value and the second pixel value.

This invention may also include a video display device for interpolating between a first and second pixel. The device includes a fraction generator for providing a signal corresponding to a first intermediate coordinate between the first coordinate and the second coordinate on the first axis. The device may also include a controller coupled to the fraction generator to receive the signal corresponding to the intermediate coordinate, the controller including logic for determining a weight factor for the first intermediate coordinate by alternatively using at least two blending functions. The device further includes an operator that is adapted to receive a first and second pixel and coupled to the controller to receive the signal corresponding to the weight factor, where the first pixel has a first pixel value and a first coordinate on a first axis, and the second pixel has a second pixel value and a second coordinate on the first axis. The operator further includes resources for calculating a first interpolated value using an equation comprising a product of the weight factor and a difference between the first pixel value and the second pixel value.

In a variation to the embodiment, the controller includes logic for implementing a first blending function for when the first intermediate coordinate is within a first domain, and a second blending function for when the first intermediate coordinate is within a second domain.

In another variation to the embodiment, a pixel order generator is coupled to the operator, and the pixel order generator provides the first and second pixel to the operator. The pixel order generator may include memory resources for receiving and storing an input matrix of pixels.

DESCRIPTION OF THE PRESENTLY PREFERRED EMBODIMENTS

The present invention provides a method and a device for approximating between known values based on an interpolation comprising two blending functions. The interpolation approach of a preferred embodiment combines a linear interpolation function with separate higher order blending functions, where each blending function is associated with a different domain of values between a first and second known endpoint. This invention may be employed with digital imaging applications where the known endpoints represent pixels. As will be described in greater detail below, the present invention provides significant advantages over the prior art in that the resulting output is more accurate than linear or quadratic methods known in the art. Furthermore, the present invention provides accurate results without complex and costly resources associated with typical second or higher order polynomial interpolation approximations.

Examples of interpolation applications include sampling analog signals into digital signals, as disclosed by U.S. Pat. No. 5,235,534 to Potter and U.S. Pat. No. 4,763,293 to Takei et al., which use interpolation in fields that include sampling analog data or signal processing. The present invention disclosed below may also be employed with any interpolation application in which two or more discrete domain and function values are known.

Interpolation for sampling or resampling digital images may be accomplished with either hardware or software. Examples of digital image applications that use interpolation include video displays, cameras on video monitors, scanners, facsimiles, and photography equipment. Other applications that benefit from this invention include resampling of two dimensional pictures from one coordinate or reference frame to another coordinate reference frame, as described in U.S. Pat. No. 4,578,812. In a specific application of a preferred embodiment, interpolation is employed to re-size or scale an image represented by pixel data. Scaling or re-sizing an image may include enlarging an original image by a magnification factor greater than one. For example, for an input image having 500×300 pixels magnified to an output image of 1000×1200, a row of pixels forming the image is scaled by a factor of 2, and a column of pixels is scaled by a factor of 4.

Figure 1:
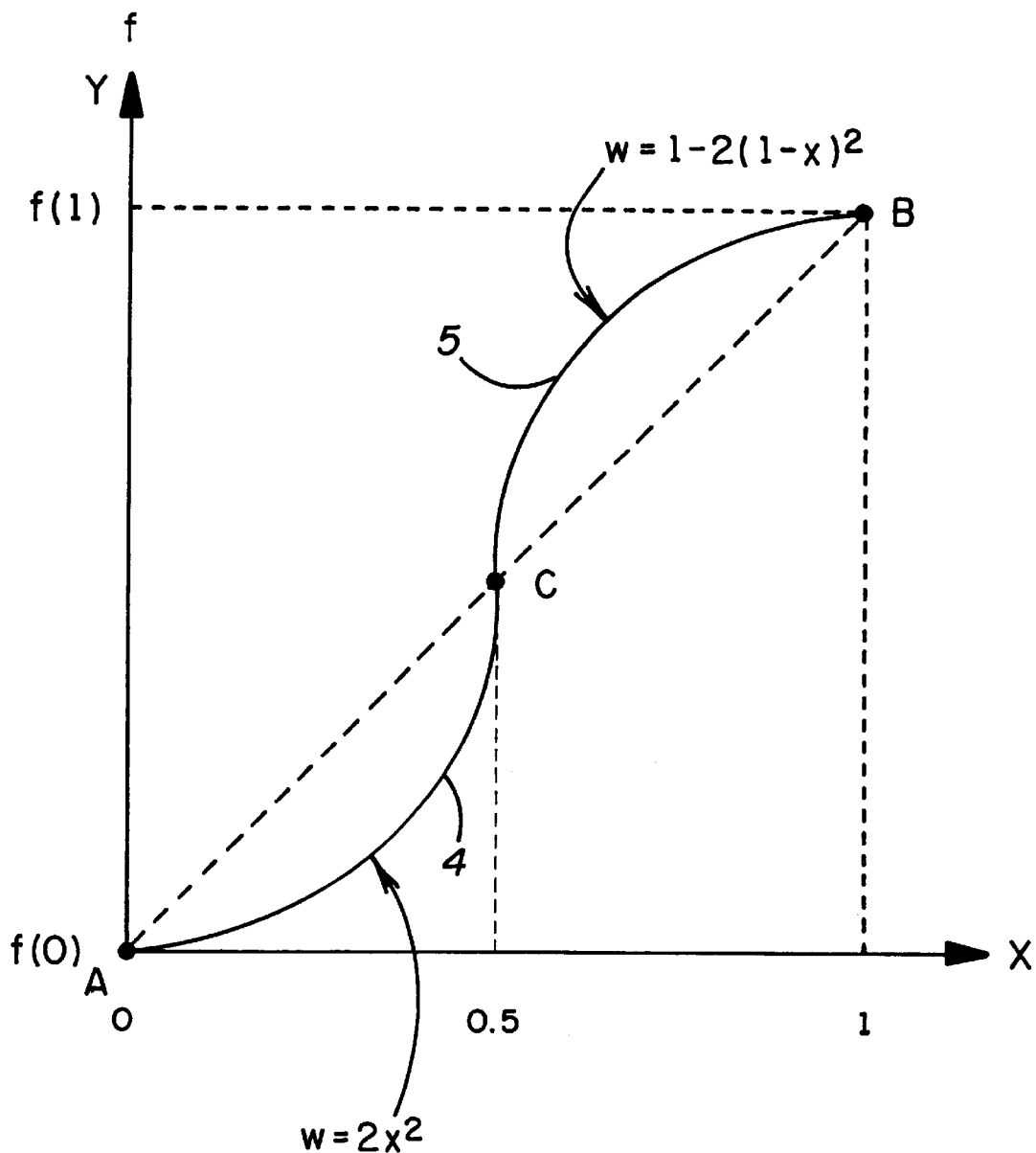
FIG. 1 is a graph illustrating interpolation under a preferred embodiment of the present invention.

FIG. 1 is an illustrative graph of a preferred interpolation approach demonstrated on a two dimensional coordinate system. Points A and B represent neighboring points or pixels in a two-dimensional image. In the context of re-sizing or scaling digital images, the x-axis represents a first coordinate position of a pixel. For applications such as video transmissions, the first coordinate system may represent, for example, either an x-coordinate of two pixels neighboring on a row of transmitted digital data, or a y-coordinate of two pixels neighboring on a column. Preferably, the y-coordinate of the graph represents one or more color values of the pixel, but may also include other parameters such as brightness or contrast. For color interpolation, the pixel value may store parameters representing red, blue, and green.

As shown by FIG. 1, a linear interpolation between points A and B serves as a base function, represented by $$f=f(0)+(f(1)-f(0))x \tag{6}$$

A first blending function, shown in FIG. 1 as curve 4, and a second blending function, shown as curve 5, may be applied to the base function of equation (6). Preferably, the first and second blending functions are quadratic polynomials which meet at a mid-point juncture C. The first derivatives of the two quadratic functions are continuous between points A and B, and also equal at point C. Accordingly, the first blending function 4 of a preferred embodiment is $$w=2x^2 \tag{7}$$

for a domain range on the x-axis given by $0.0 \leq x \leq 0.5$. A second blending function 5 is $$w=1-2(1-x)^2 \tag{8}$$

for $0.5 \leq x \leq 1.0$. The first and second blending functions 4 and 5 may each be substituted into equation (6) to provide $$f=f(0)+(f(1)-f(0))w \tag{9}$$

Equation 9 may be simplified by substituting for D as follows $$D=f(1)-f(0) \tag{10}$$

to yield $$f=2Dx^2+f(0) \tag{11}$$

for domain range $0 \leq x \leq 0.5$ and $$f=-2Dx^2+4Dx-2D+f(1) \tag{12}$$

for domain range $0.5 < x \leq 1.0$. In this manner, equation (11) provides an interpolated pixel value for an intermediate point, when a first coordinate of the intermediate point is within a first domain subset of the known pixels, which is less than or equal to 0.5 for the embodiment of FIG. 1. Likewise, equation (12) provides an interpolated pixel value to an intermediate point having a first position coordinate in a second domain subset of the known pixels, which is greater than 0.5 and less than or equal to 1.0 for the embodiment of FIG. 1.

The present invention improves over the prior art by using blending functions having a higher order than the base function. The accuracy of the interpolation is of the order of the blending functions, but the number of inputs needed are determined by the base function. For quadratic blending functions combined with a linear base function, only two input points or pixels are needed to produce one or more interpolated points. As such, the interpolation approach of this invention conserves resources such as temporary storage devices, line buffers, or source code needed to interpolate with three or more input points. Moreover, the resulting interpolated output image produced by this invention has the accuracy of the higher order blending functions. While a preferred embodiment has been described using dual quadratic blending functions and a linear base function, alternative embodiments may use blending functions that are cubic or higher order. For alternative embodiments and variations, the blending and base functions, as well as their respective first derivatives, are continuous between the known pixels or endpoints. In addition, the blending functions and their respective first derivatives are preferably equal at a juncture that defines adjacent domain ranges for the weighting function.

Figure 2:
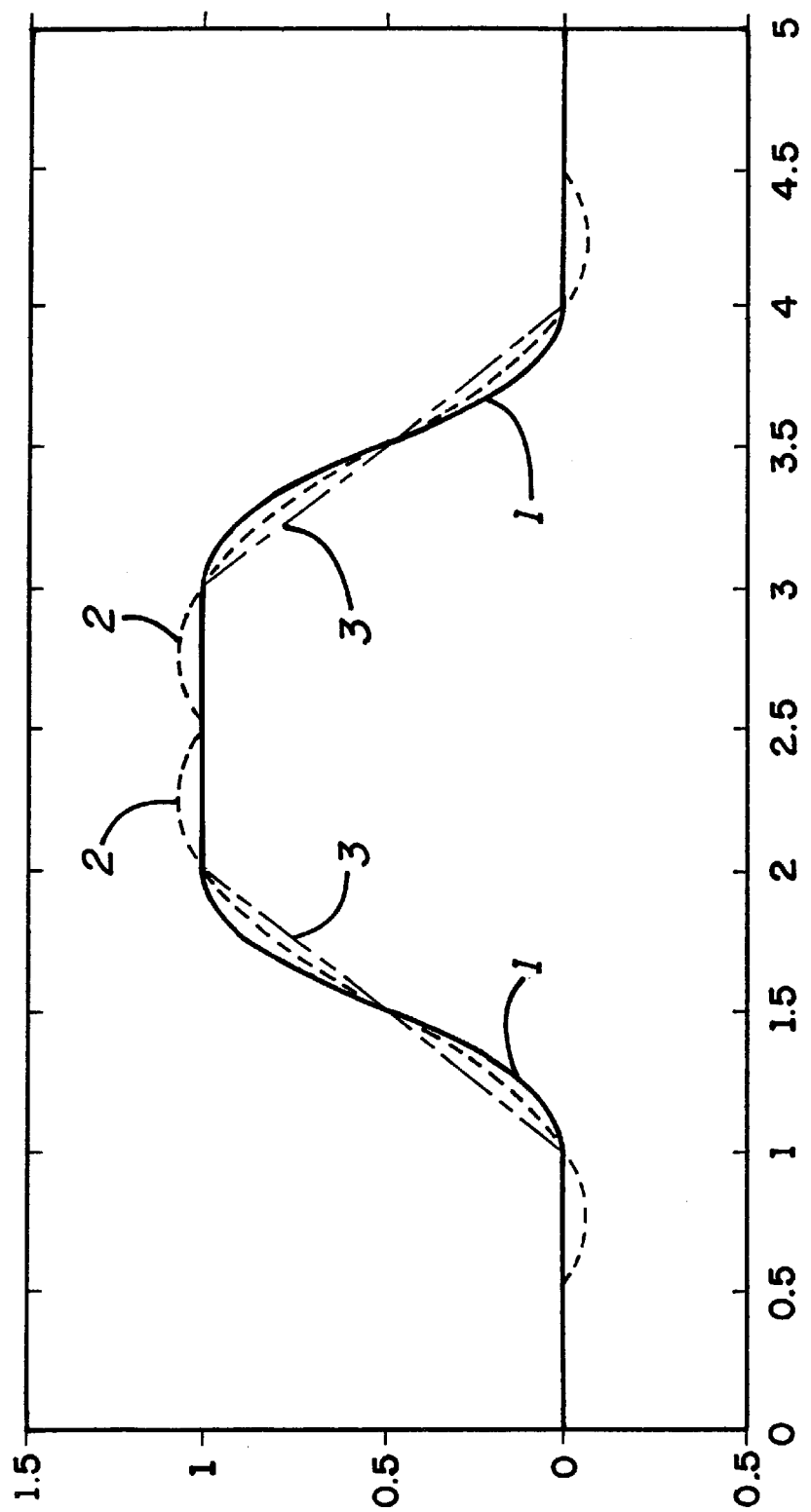
FIG. 2 is a graph illustrating an output under a preferred embodiment of the present invention compared with outputs derived from linear and quadratic interpolation approaches known in the art.

FIG. 2 highlights some advantages of this invention by showing a sample output using an interpolation approach of a preferred embodiment compared to sample outputs under the known art. FIG. 2 represents a two-fold magnification between the output and input image. Interpolated points are shown on FIG. 2 at x=0.5, 1.5, . . . 4.5, and known pixel points are provided at x=0.0, 1.0, . . . 5.0. Curve 1 is a preferred sample output curve using a linear base function and quadratic blending functions according to this invention. A sample linear interpolation known in the art is shown by output curve 2, and a Greggain quadratic interpolation is shown by output curve 3. Curve 1 assumes the characteristics of the first quadratic blending function in between a first domain of $1.0 \leq x \leq 1.5$, and a second blending function in between a second domain of $1.5 \leq x \leq 2.0$. The interpolated point of x=1.5 is a juncture where the first and second blending functions are equal. Moreover, the dual quadratic blending functions of a preferred embodiment combine to produce a curve having an upward concavity in the first domain, and a downward concavity in the second domain. The concavity of the combined blending functions allows curve 1 to avoid overshooting in the y-direction. As a result, the output curve 1 is shown as a smooth curve, blended or rounded at regions of the graph where the pixel value changes, such as between x=1.0 and x=2.0. In contrast, linear output curve 2 is jagged at points where the pixel value is changing, resulting in fuzziness and loss of contrast between the input image and the output image. Likewise, quadratic output curve 3 overshoots in the y-direction.

Figure 3:
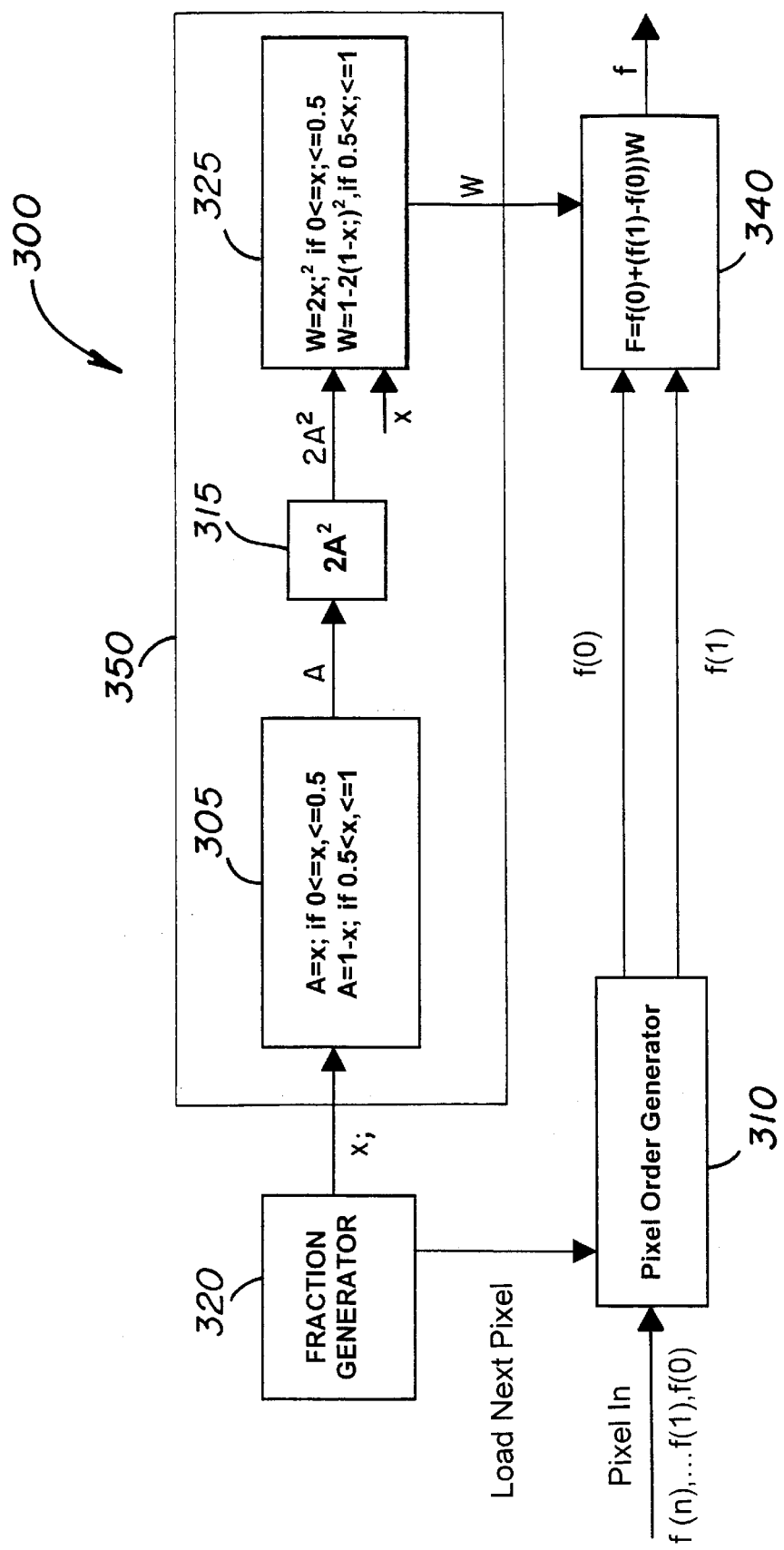
FIG. 3 is a block diagram of a system incorporating the present invention.

FIG. 3 shows a hardware, block diagram of a preferred assembly 300 for implementing the interpolation approach of this invention. The components of FIG. 3 may be hardwired onto one or more computer chips. The components of FIG. 3 represent separate or integrated arrangements of circuits of logic sequences to perform the stated functions of the computer. The assembly 300 is provided with an input matrix of pixels, as well as information regarding a size of the output matrix of pixels. The assembly 300 comprises a fraction generator 320 for producing an increment factor coupled to a weighting controller 350 and a pixel order generator 310.

The pixel order generator 310 and the weighting control 350 are coupled to a mathematical operator 340. The pixel order generator 310 receives pixel data in the form of an input array data, and generates an order of pixels as an output to the assembly 300. The pixel order generator 310 may include memory resources for storing an input array of pixels. In a preferred embodiment, pixel order generator 310 outputs neighboring first and second pixels from the input array in a scanline order. The assembly 300 then interpolates for a pixel value having a coordinate between the first coordinates of the first and second pixels. Preferably, the first and second pixels are arranged next to each other in a row or column of the input array.

The fraction generator 320 provides an increment length based on a magnification factor that enlarges the output image with regard to the input image. The fraction generator 320 uses information from the input array and the size of the output array to determine new pixels for the output array of pixels. In this way, interpolation may be used to enlarge an input image, where pixels of the input image are mapped as known points to an output image, and additional pixels present in the output image between known pixels are determined by interpolation. Based on the desired magnification, the fraction generator 320 outputs an intermediate first coordinate between the first coordinates of the first and second pixels. The pixel value, such as values for color and brightness, is then determined for the intermediate coordinate using interpolation. The first coordinate of the intermediate point is positioned an increment length away from the first coordinate of the pixel. Preferably, the increment length between the intermediate point and the first pixel is inversely proportional to a magnification factor. The first coordinate position of the intermediate point, designated in this description as $x_i$, may be derived from the increment length outputted from the fraction generator 320.

The weighting controller 350 generates the blending functions to weight the base function. The weighting controller 350 receives a signal input from the fraction generator 320 corresponding to the first coordinate position of the intermediate point with respect to the known endpoints or pixels. In a preferred embodiment, the first and second quadratic blending functions are derived using the input from the fraction generator 320 by first assigning $$A = x_i \text{ for } 0 \leq x_i \leq 0.5$$

$$A = 1 - x_i \text{ for } 0.5 < x_i \leq 1.0 \tag{13}$$

in a first stage 305 of the weighting control 350. The left hand side of equation (13) defined as A is outputted from the first stage 305 to a second stage 315. In the second stage 315, A is multiplied by 2A to yield $2A^2$, which is then outputted to a third stage 325 of the weighting control 350. In the third stage of a preferred embodiment, the input from the second stage 315 is substituted into equation (13), with the first coordinate of the intermediate point inputted from the fraction generator 320 to select the first or second blending functions. This yields $$W = 2x_i^2 \text{ for } 0 \leq x_i \leq 0.5;$$

or $$W = 1 - 2(1 - x_i)^2 \text{ for } 0.5 < x_i \leq 1.0 \tag{14}$$

as the first and second quadratic blending functions which are outputted from the weighting control 350.

From the pixel order generator 310, the known pixels or end points f(0) and f(1) are passed to the operator 340, which comprises a multiplier and/or adder. The operator 340 implements equation (1) using W derived in the weighting controller 350. Therefore, with b=f(0), m=f(1)−f(0), the resulting combination of the weighting controller 350 and the operator 340 may be expressed as $$f = f(0) + ((f(1) - f(0)))W \tag{15}$$

where W incorporates the first coordinate of an intermediate point having two domain ranges between the first and second known pixels shown here as $0 \leq x_i \leq 0.5$ or $0.5 < x_i \leq 1.0$. An output is then represented by $f(x_i)$ for any intermediate point between boundaries represented by the first coordinates of the endpoints.

The present invention may also be implemented with systems and applications discussed above using software. A psuedocode description of one preferred implementation includes the following:

```
/* Scales sizeIn input points into sizeOut output points with dual-quadratic interpolation. The
array of input points is called in. The array of output points is called out. */
dual_quadratic(in[], sizeIn, out[], sizeOut)
{
    /* Determine increment */
    inc = (sizeIn -1) / (SizeOut -1);
    /* Initialization */
    f0 = in[0];   /* First pixel in input array */
    f1 = in[1];   /* Second pixel in input array */
    fNext = 2;    /* First index of "next pixel" */
    /* For every output point */
    i = 0;
    while (i<sizeOut) {
        /* Apply dual-quadratic interpolation (Blocks 300 & 340) */
        if (frac<=0.5) w = 2*frac*frac;      /* Block 300 */
        else w = 1-2*(1-frac)*(1-frac);      /* Block 300 */
        out[i] = f0 + (f1-f0)*w;             /* Block 340 */
        /* Increment the fraction (in the Fraction Generator, Block 320) */
        frac frac + mc;
        /* If fraction >= 1, then load next pixel (Blocks 310 & 320) */
        if (frac>=1) { /* If this is true, 320 asserts the "Load Next Pixel" signal to 310 */
            f0 = f1;              /* Second pixel becomes first pixel (310) */
            f1 = in[fNext];       /* Bring in a new second pixel ("next pixel") (310) */
            fNext = fNext + 1;    /* Increment index of next pixel (310) */
            frac = frac - 1; /* Only fraction part is needed for interpolation (320) */
        }
        /* Step to next output pixel */
        i = 1 + 1;
    }
}
```

Interpolation according to a preferred embodiment may be repeated for the known pixels in a second coordinate direction. As such, the algorithm 400 is equally applicable for input signal generated according to a second pixel order. Therefore, in one pass, the algorithm may interpolate in a first coordinate axis corresponding to a row-wise or x-direction, while in a second pass, the algorithm may intepolate in a second coordinate axis corresponding to a column-wise or y-direction.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of

What is claimed is:

1. A method for interpolating between a first and second pixel in a video display system, the first pixel having a first pixel value and a first coordinate on a first axis, and the second pixel having a second pixel value and a second coordinate on the first axis, the method comprising:

a. providing to data processing resources a first intermediate coordinate in between the first and second coordinates on the first axis;

b. determining in the data processing resources, a weight factor for the first intermediate coordinate by inputting the first intermediate coordinate into a first blending function when the first intermediate coordinate is within a first domain, and by inputting the first intermediate coordinate into a second blending function when the first intermediate coordinate is within a second domain, wherein the first blending function and the second blending function are different; and c. calculating in the data processing resources a first interpolated value from a first product of the weight factor for the first intermediate coordinate and a function of the first pixel value and the second pixel value.

2. A method for interpolating between a first and second pixel in a line of pixels in an image in a video display system, the first pixel having a first pixel value and a first coordinate on the line, and the second pixel having a second pixel value and a second coordinate on the line to determine an interpolated pixel value for an intermediate pixel having a first intermediate coordinate on the line between the first and second coordinates, the method comprising:

determining in data processing resources, a weight factor for the first intermediate coordinate by inputting the first intermediate coordinate into a first quadratic blending function if the first intermediate coordinate is within a first range between the first coordinate and the second coordinate, or by inputting the first intermediate coordinate into a second quadratic blending function if the first intermediate coordinate is within a second range between the first coordinate and the second coordinate;

calculating in the data processing resources the interpolated pixel value in response to the weight factor for the first intermediate coordinate and in response to a function of the first pixel value and the second pixel value;

inserting an intermediate pixel having the interpolated value in the first intermediate coordinate on the line between the first and second pixels; and outputting a modified line including said intermediate pixel.

3. The method of claim 2, including providing the first intermediate coordinate by incrementing the first coordinate of the first pixel by an increment length proportional to a ratio of a number of pixels per line of an input image to a number of pixels per line of an output image.

4. The method of claim 2, wherein a derivative of the first quadratic blending function and a derivative of the second quadratic blending function are each continuous between the first and second pixels.

5. The method of claim 2, wherein the first quadratic blending function is $$W=2x^2;$$ and the second quadratic blending function is $$W=1-2(1-x)^2,$$

where W is the weight factor, and x is the first intermediate coordinate.

6. The method of claim 3, further comprising:
   a. providing a second intermediate coordinate in between the first and second coordinates by incrementing the first intermediate coordinate by an increment length;
   b. determining a weight factor for the second intermediate coordinate by either inputting the second intermediate coordinate into a third quadratic blending function if the second intermediate coordinate is within the first range between the first and second coordinates, or by inputting the second intermediate coordinate into a fourth quadratic blending function if the second intermediate coordinate is within the second range between the first and second coordinates; and
   c. calculating a second interpolated value in response to the weight factor for the second intermediate coordinate and in response to the function of the first pixel value and the second pixel value.

7. The method of claim 6, wherein the third blending function is the same as the first blending function, and the fourth blending function is the same as the second blending function.

8. The method of claim 6, wherein the first range is from the first coordinate to a midway coordinate positioned less than or equal to one half of the difference between the first coordinate and the second coordinate, and the second range is from the midway coordinate and the second coordinate.

9. The method of claim 2, wherein the first and second pixel value and the interpolated value represent a light intensity.

10. The method of claim 2, wherein the first and second pixel value and the interpolated value represent a contrast of the corresponding pixel.

11. The method of claim 2, wherein the first and second pixel value and the interpolated value represent one of red, green, and blue color values of the corresponding pixel.

12. The method of claim 2, wherein the first and second pixel value and the interpolated value each represent a color content of the respective first and second pixel.

13. The method of claim 2, including receiving a line of pixels as input to a buffer, including the first and second pixels, and in which the weight factor is calculated according to one of the first and second quadratic blending functions in response to only the first and second pixels in the line of pixels, whereby only two input pixel coordinates and two input pixel values are utilized in computing the interpolated pixel value.

* * * * *